US010447529B2

(12) United States Patent
Maruyama

(10) Patent No.: US 10,447,529 B2
(45) Date of Patent: Oct. 15, 2019

(54) RELAY APPARATUS, RELAY METHOD, AND NON-TRANSITORY COMPUTER READABLE MEDIUM

(71) Applicant: FUJI XEROX CO., LTD., Tokyo (JP)

(72) Inventor: Yasuhiro Maruyama, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 765 days.

(21) Appl. No.: 14/986,870

(22) Filed: Jan. 4, 2016

(65) Prior Publication Data

US 2017/0063607 A1 Mar. 2, 2017

(30) Foreign Application Priority Data

Aug. 24, 2015 (JP) ................................ 2015-164608

(51) Int. Cl.
*H04L 12/24* (2006.01)
*G06F 11/07* (2006.01)
*H04L 29/08* (2006.01)

(52) U.S. Cl.
CPC ...... *H04L 41/0686* (2013.01); *G06F 11/0727* (2013.01); *G06F 11/0733* (2013.01); *G06F 11/0766* (2013.01); *H04L 67/1097* (2013.01)

(58) Field of Classification Search
CPC ..... G06F 21/31; H04L 63/0838; H04L 63/12; H04L 67/06

See application file for complete search history.

(56) References Cited

U.S. PATENT DOCUMENTS

| 2010/0150157 A1 | 6/2010 | Wang et al. |
| 2012/0239821 A1 | 9/2012 | Hozumi |
| 2013/0268260 A1* | 10/2013 | Lundberg ............... G06F 17/28 704/8 |
| 2014/0101725 A1 | 4/2014 | Shinoda |

(Continued)

FOREIGN PATENT DOCUMENTS

JP 2013-025387 A 2/2013

OTHER PUBLICATIONS

Communication dated Jun. 16, 2016, issued by the European Patent Office in corresponding European Application No. 16157026.2.

(Continued)

*Primary Examiner* — Barbara B Anyan
(74) *Attorney, Agent, or Firm* — Sughrue Mion, PLLC

(57) ABSTRACT

A relay apparatus includes a memory, a receiving unit, a transmitting unit, and a second transmitting unit. The memory stores authentication information of a user and failure handling information for the user. The user uses a cloud service. The failure handling information is used when storing of data in the cloud service fails. The receiving unit receives user information of the user, data to be stored in the cloud service, and a storage request to the cloud service, from an image processing apparatus. The transmitting unit transmits the authentication information of the user and the data to be stored in the cloud service to the cloud service in accordance with the storage request to the cloud service. When storing of the data in the cloud service fails, the second transmitting unit refers to the failure handling information and transmits information about a failure handling method to the user.

8 Claims, 6 Drawing Sheets

(56) References Cited

U.S. PATENT DOCUMENTS

| | | | |
|---|---|---|---|
| 2014/0201541 A1* | 7/2014 | Paul | G06F 21/6245 713/193 |
| 2014/0304756 A1* | 10/2014 | Fletcher | H04N 21/2387 725/115 |
| 2014/0325517 A1* | 10/2014 | Takahashi | G06F 9/5077 718/102 |
| 2015/0116447 A1* | 4/2015 | Kobayashi | H04L 12/1818 348/14.02 |
| 2016/0094634 A1* | 3/2016 | Nosaki | H04L 67/1002 709/205 |
| 2016/0224782 A1* | 8/2016 | Miyakawa | G06F 21/45 |

OTHER PUBLICATIONS

Communication dated Apr. 9, 2019, issued by the Japanese Patent Office in corresponding Japanese Application No. 2015-164608.

* cited by examiner

| USER ID (510) | CLOUD SERVICE ID (520) | ACCESS INFORMATION (530) |
|---|---|---|
| 1234 | GDdddd | (TOKEN FOR 1234 TO ACCESS GDdddd) |
| 1234 | EvvvNnnn | (TOKEN FOR 1234 TO ACCESS EvvvNnnn) |
| 1234 | Bbb | (TOKEN FOR 1234 TO ACCESS Bbb) |
| 2345 | GDdddd | (TOKEN FOR 2345 TO ACCESS GDdddd) |
| 2345 | Bbb | (TOKEN FOR 2345 TO ACCESS Bbb) |

| USER ID (610) | SETTING (620) |
|---|---|
| 1234 | SERVICE SPECIFICATION |
| 1234 | CANCEL |
| 1234 | DOWNLOAD |
| 2345 | SERVICE SPECIFICATION |
| 2345 | CANCEL |
| 3456 | DOWNLOAD |

RELAY APPARATUS, RELAY METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-164608 filed Aug. 24, 2015.

BACKGROUND

Technical Field

The present invention relates to a relay apparatus, a relay method, and a non-transitory computer readable medium.

SUMMARY

According to an aspect of the invention, there is provided a relay apparatus including a memory, a receiving unit, a transmitting unit, and a second transmitting unit. The memory stores authentication information of a user and failure handling information for the user. The user uses a cloud service. The failure handling information is used when storing of data in the cloud service fails. The receiving unit receives user information of the user, data to be stored in the cloud service, and a storage request to the cloud service, from an image processing apparatus. The transmitting unit transmits the authentication information of the user and the data to be stored in the cloud service to the cloud service in accordance with the storage request to the cloud service. When storing of the data in the cloud service fails, the second transmitting unit refers to the failure handling information and transmits information about a failure handling method to the user.

BRIEF DESCRIPTION OF THE DRAWINGS

Exemplary embodiment of the present invention will be described in detail based on the following figures, wherein:

FIG. 5 is a diagram for describing an exemplary data structure of an access-token management table;

FIG. 6 is a diagram for describing an exemplary data structure of a user-setting management table.

DETAILED DESCRIPTION

A desirable exemplary embodiment for embodying the present invention will be described below on the basis of the drawings.

Figure 1:
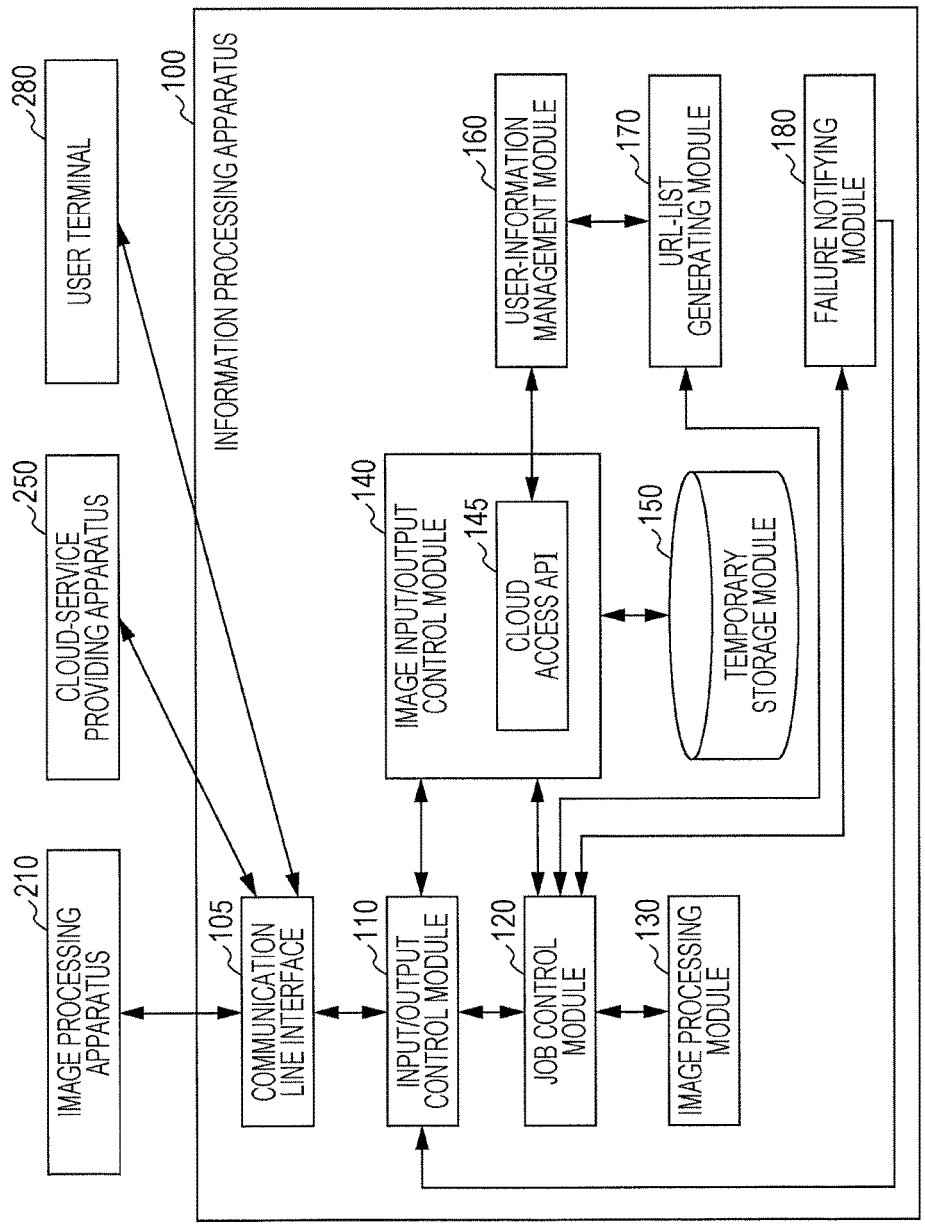
FIG. 1 is a conceptual diagram illustrating an exemplary module configuration according to the present exemplary embodiment.

FIG. 1 is a conceptual diagram illustrating an exemplary module configuration according to the present exemplary embodiment.

In general, a module refers to a component, such as software (a computer program) that is logically separable or hardware. Thus, a module in the exemplary embodiment refers to not only a module in terms of a computer program but also a module in terms of a hardware configuration. Consequently, the description of the exemplary embodiment also serves as a description of a system, a method, and a computer program which cause the hardware configuration to function as a module (a program that causes a computer to execute procedures, a program that causes a computer to function as units, or a program that causes a computer to implement functions). For convenience of explanation, the terms "to store something" and "to cause something to store something", and equivalent terms are used. These terms mean that a storage apparatus stores something or that a storage apparatus is controlled so as to store something, when the exemplary embodiment is achieved by using computer programs. One module may correspond to one function. However, in the implementation, one program may constitute one module, or one program may constitute multiple modules. In contrast, multiple programs may constitute one module. Additionally, multiple modules may be executed by one computer, or one module may be executed by multiple computers in a distributed or parallel processing environment. One module may include another module. Hereinafter, the term "connect" refers to logical connection, such as transmission/reception of data, an instruction, or reference relationship between pieces of data, as well as physical connection. The term "predetermined" refers to a state in which determination has been made before a target process. This term also includes a meaning in which determination has been made in accordance with the situation or state at that time or the situation or state before that time, not only before processes according to the exemplary embodiment start, but also before the target process starts even after the processes according to the exemplary embodiment have started. When multiple "predetermined values" are present, these may be different from each other, or two or more of the values (including all values, of course) may be the same. A description having a meaning of "when A is satisfied, B is performed" is used as having a meaning of "whether or not A is satisfied is determined and, when it is determined that A is satisfied, B is performed". However, this term does not include a case where the determination of whether or not A is satisfied is unnecessary.

A system or apparatus refers to one in which multiple computers, pieces of hardware, devices, and the like are connected to each other by using a communication unit such as a network which includes one-to-one communication connection, and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (social system) operating on man-made agreements.

For each of the modules performing the processes, or for each of the processes if the processes are performed in a single module, target information is read out from a storage apparatus. After the process is performed, the processing result is written in a storage apparatus. Accordingly, description about the reading of data from the storage apparatus before the process and the writing into the storage apparatus after the process may not be made. Examples of the storage apparatus may include a hard disk, a random access memory (RAM), an external storage medium, a storage apparatus via a communication line, and a register in a central processing unit (CPU).

An information processing apparatus 100 according to the present exemplary embodiment functions as a relay apparatus between an image processing apparatus 210 and a cloud-service providing apparatus 250. As illustrated in the example in FIG. 1, the information processing apparatus 100 includes a communication line interface 105, an input/output control module 110, a job control module 120, an image processing module 130, an image input/output control module 140, a temporary storage module 150, a user-information management module 160, a URL-list generating module 170 which generates a uniform resource locator (URL) list when a failure occurs, and a failure notifying module 180 which transmits a notification that the process ends in failure.

The information processing apparatus 100 stores image data which is obtained through reading by using the image processing apparatus 210 in the cloud-service providing apparatus 250. At that time, storing of the data in the cloud-service providing apparatus 250 may fail. The information processing apparatus 100 transmits information about failure handling methods for the storage failure to a user.

The image processing apparatus 210 which is connected to the information processing apparatus 100 so as to be capable of communicating with the information processing apparatus 100 is capable of reading an image. For example, the image processing apparatus 210 is a copier, a fax, a scanner, a multi-function device (an image processing apparatus having at least two of the functions of scanning, printing, copying, faxing, and the like), or a camera. To use the image processing apparatus 210, a process (login process) of checking if a user has been registered is performed. An exemplary login process may be a process in which a user operates a keyboard or the like, and in which user information (user identification (ID)), a password, and the like are received to be checked against information registered in advance. Another exemplary login process may be a process in which, by using an IC card reader or the like, an IC card carried by a user is read, and in which information stored in the IC card is checked. Another exemplary login process may be a process in which biometric authentication such as one using a fingerprint is used.

The cloud-service providing apparatus 250 which is connected to the information processing apparatus 100 so as to be capable of communicating with the information processing apparatus 100 provides a service for storing data, which is an exemplary cloud service. For example, data which is obtained through reading by using the image processing apparatus 210 is stored (uploaded), and the data is read (downloaded) by a user terminal 280. In this case, it is guaranteed that a user who performs reading by using the image processing apparatus 210 is the same person as a user of the user terminal 280. The cloud-service providing apparatus 250 may be used to share data with other users.

The user terminal 280 which is connected to the information processing apparatus 100 so as to be capable of communicating with the information processing apparatus 100 accesses data stored in the cloud-service providing apparatus 250, receives information about failure handling methods which is transmitted from the information processing apparatus 100, and displays the received information. According to a user operation performed in accordance with a failure handling method, the user terminal 280 may perform the failure handling method. Examples of the user terminal 280 includes a personal computer and a portable information terminal (a cellular phone encompassing a smartphone, a portable tablet terminal, and the like) having a communication function. When the user terminal 280 is to be used, the login process is also performed. However, for the user terminal 280 like a portable information terminal, which is used under the assumption that the same user always uses the user terminal 280, it may be unnecessary to perform the login process every time the user terminal 280 is to be used.

The communication line interface 105 is connected to the input/output control module 110, and is connected to the image processing apparatus 210, the cloud-service providing apparatus 250, and the user terminal 280 so as to be capable of communicating with the image processing apparatus 210, the cloud-service providing apparatus 250, and the user terminal 280. The communication line interface 105 communicates with the image processing apparatus 210, the cloud-service providing apparatus 250, and the user terminal 280. Specifically, the communication line interface 105 is an interface for the information processing apparatus 100 communicating with other apparatuses, such as the image processing apparatus 210, the cloud-service providing apparatus 250, and the user terminal 280, via a communication line. For example, Ethernet® or a Universal Serial Bus (USB) interface is used.

The input/output control module 110 is connected to the communication line interface 105, the job control module 120, the image input/output control module 140, and the failure notifying module 180. The input/output control module 110 receives user information (for example, a user ID) of a user, data which is to be stored in the cloud-service providing apparatus 250, and a storage request to the cloud-service providing apparatus 250, from the image processing apparatus 210 via the communication line interface 105. Specifically, the input/output control module 110 has a function of controlling communication via the communication line interface 105 and monitoring unauthorized access and viruses from the outside so as to maintain a secure condition.

The job control module 120 is connected to the input/output control module 110, the image processing module 130, the image input/output control module 140, the URL-list generating module 170, and the failure notifying module 180. The job control module 120 receives data from the image processing apparatus 210, and controls the order of jobs to be processed by the information processing apparatus 100. For example, in the case where data is to be subjected to image processing and where the data is then to be transmitted to the cloud-service providing apparatus 250, the job control module 120 requests the image processing module 130 to perform a process, and then requests the image input/output control module 140 to perform a process.

In particular, when storing of data in the cloud-service providing apparatus 250 fails, the job control module 120 invokes the URL-list generating module 170 and the failure notifying module 180 to exert control so that information about failure handling methods is transmitted to a user. More specifically, the job control module 120 has an interpretation function of the representational state transfer interface (REST I/F), and collaboratively operates with the cloud-service providing apparatus 250 and the like.

The image processing module 130 is connected to the job control module 120. The image processing module 130 is constituted by software programs for performing image processing. Examples of image processing include noise removal, color conversion, file format conversion, and a character recognition process.

The image input/output control module 140 having a cloud access application programming interface (API) 145 is connected to the input/output control module 110, the job control module 120, and the temporary storage module 150. The image input/output control module 140 accesses the cloud-service providing apparatus 250. As illustrated in the example in FIG. 1, the image input/output control module 140 receives/transmits information from/to the cloud-service providing apparatus 250 on the basis of functions of the cloud access API 145 included therein. In the case of a job in which data is stored in the cloud-service providing apparatus 250, the image input/output control module 140 uses the input/output control module 110 to upload files to the cloud. In contrast, in the case of a job in which data is obtained from the cloud-service providing apparatus 250, the image input/output control module 140 uses the input/output control module 110 to download data from the cloud-service providing apparatus 250.

The cloud access API 145 is connected to the user-information management module 160. The cloud access API 145 transmits authentication information of a user and data that is to be stored in the cloud-service providing apparatus 250, via the input/output control module 110 to the cloud-service providing apparatus 250 in accordance with the storage request to the cloud-service providing apparatus 250. The authentication information of a user may be obtained by extracting recognition information corresponding to the user information received from the image processing apparatus 210, by using a table in which user information and recognition information of the user are stored so as to be associated with each other, and which is stored in the user-information management module 160.

The temporary storage module 150 is connected to the image input/output control module 140. The temporary storage module 150 temporarily stores data which is obtained through reading by using the image processing apparatus 210.

The user-information management module 160 is connected to the cloud access API 145 of the image input/output control module 140, and the URL-list generating module 170. The user-information management module 160 manages information associated with a user. For example, the user-information management module 160 stores authentication information (hereinafter also referred to as an access token) of a user using the cloud-service providing apparatus 250, and failure handling information used when storing of data in the cloud-service providing apparatus 250 fails, for the user. The expression "when storing of data fails" indicates the case in which, when image data (also referred to as scan data) which is obtained through reading by using the image processing apparatus 210 is to be stored in the cloud-service providing apparatus 250, storing of the image data in the cloud-service providing apparatus 250 fails. In this case, the failure occurs due to the image processing apparatus 210, due to the cloud-service providing apparatus 250, or due to the communication line and the like between the image processing apparatus 210 and the cloud-service providing apparatus 250.

The user-information management module 160 may store information (user ID) for identifying a user uniquely in the present exemplary embodiment, the user name, an address (such as a mail address) for transmitting a notification to the user, information about cloud services which may be used by the user, and the like. For example, the user-information management module 160 may register a user.

Specifically, the user-information management module 160 stores an access-token management table 500 and a user-setting management table 600.

FIG. 5 is a diagram for describing an exemplary data structure of the access-token management table 500. The access-token management table 500 has a user ID field 510, a cloud service ID field 520, and an access information field 530. The access-token management table 500 manages authentication information for accessing cloud services for each user. The user ID field 510 stores a user ID. The cloud service ID field 520 stores information (cloud service ID) for uniquely identifying a cloud service which may be used by the user of the user ID, in the present exemplary embodiment. The access information field 530 stores authentication information for accessing the cloud service. The authentication information is information for using a cloud service in which data which is obtained through reading by using the image processing apparatus 210 is stored. Specifically, the authentication information is information necessary for the login process, and encompasses an access token, a password, or the like.

FIG. 6 is a diagram for describing an exemplary data structure of the user-setting management table 600. The user-setting management table 600 has a user ID field 610 and a setting field 620. The user ID field 610 stores a user ID. The setting field 620 stores a setting for the user of the user ID (failure handling information used when storing of data in the cloud-service providing apparatus 250 fails).

The URL-list generating module 170 is connected to the job control module 120 and the user-information management module 160. The URL-list generating module 170 accesses the user-information management module 160 to generate URL information in which the link to a page for performing a failure handling method is made for each user. This page may encompass a page in which a process for a failure handling method is described.

The failure notifying module 180 is connected to the input/output control module 110 and the job control module 120. When storing of data in the cloud-service providing apparatus 250 fails, the failure notifying module 180 refers to failure handling information in the temporary storage module 150, and transmits the information about failure handling methods to a user. This transmission may be performed by using a notification using an electronic mail, a chat, a bulletin board system, or social media, a push notification, or the like.

The failure notifying module 180 may transmit the URL information generated by the URL-list generating module 170.

The failure notifying module 180 may change information about failure handling methods in accordance with the reason of the failure, and may transmit the changed information to the user.

Figure 2:
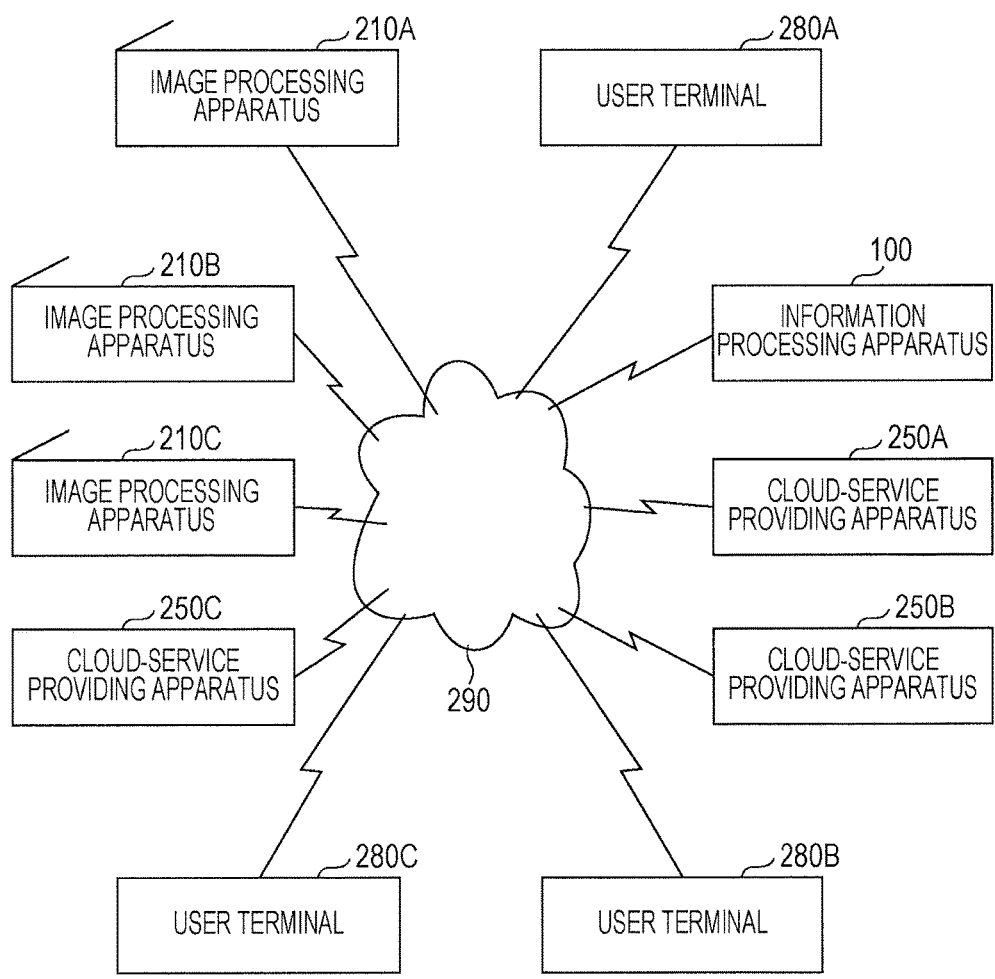
FIG. 2 is a diagram for describing an exemplary system configuration employing the present exemplary embodiment.

FIG. 2 is a diagram for describing an exemplary system configuration employing the present exemplary embodiment.

The information processing apparatus 100, an image processing apparatus 210A, an image processing apparatus 210B, an image processing apparatus 210C, a cloud-service providing apparatus 250A, a cloud-service providing apparatus 250B, a cloud-service providing apparatus 250C, a user terminal 280A, a user terminal 280B, and a user terminal 280C are connected to one another via a communication line 290. The communication line 290 may be a wireless network, a wired network, or a combination of these. For example, the communication line 290 may be the Internet, an intranet, or the like which serves as a communications infrastructure.

Through operations performed by a user by using the image processing apparatus 210, an image is read, the cloud-service providing apparatus 250 is specified, and a storage request for storing the image data is transmitted to the information processing apparatus 100. In this case, the image processing apparatus 210 transmits a user ID, specification of a cloud-service providing apparatus 250, image data, and a storage request to the information processing apparatus 100. The information processing apparatus 100 receives these pieces of information, and uses authentication information of the user ID to store the image data in the cloud-service providing apparatus 250. The cloud-service providing apparatus 250 stores the image data, and receives access from the user terminal 280 used by the user. When storing of the image data in the cloud-service providing apparatus 250 fails, the information processing apparatus 100 transmits information about failure handling methods for the failure, to the user.

Figure 3:
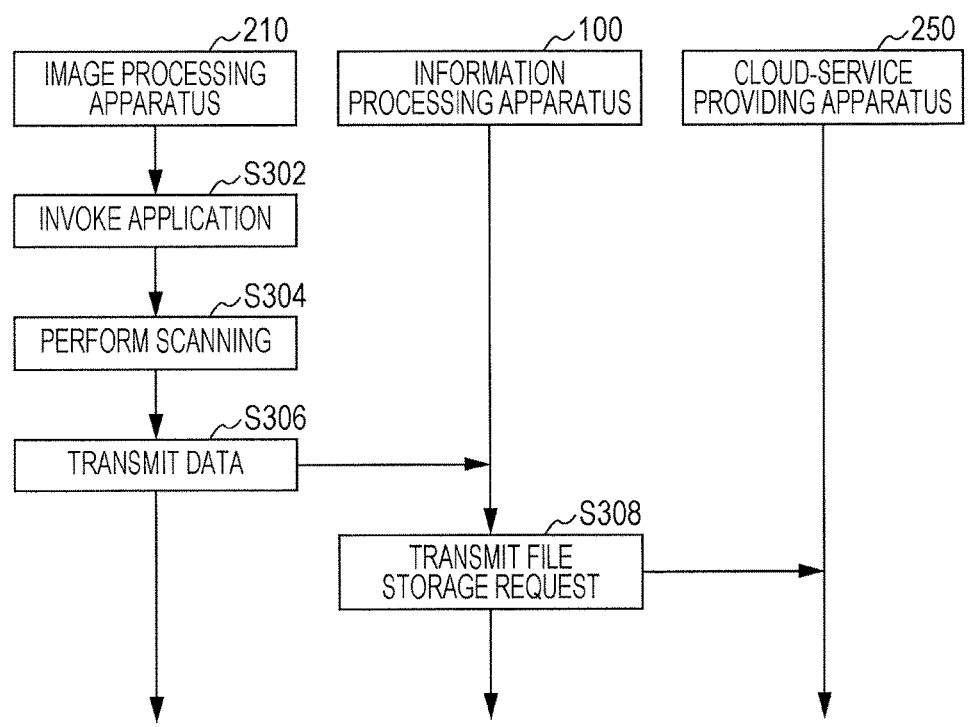
FIG. 3 is a flowchart of an exemplary process according to the present exemplary embodiment.

FIG. 3 is a flowchart of an exemplary process performed in the present exemplary embodiment (by the image processing apparatus 210, the information processing apparatus 100, and the cloud-service providing apparatus 250). Specifically, an exemplary flow in which an image generated through scanning using the image processing apparatus 210 is stored in the cloud-service providing apparatus 250 via the information processing apparatus 100 is illustrated.

As illustrated in the example in FIG. 3, the image processing apparatus 210 invokes an application for providing a function of performing scanning and storing of a file in the cloud-service providing apparatus 250, in accordance with operations and the like performed by a user on a display panel (step S302).

The user performs operations on a graphical user interface (GUI) of the invoked application, whereby the image processing apparatus 210 performs scanning (step S304).

When image data is generated through scanning, the image processing apparatus 210 transmits a file storage request to the cloud-service providing apparatus 250 and the image information to the information processing apparatus 100 (step S306).

In the information processing apparatus 100 which receives the information from the image processing apparatus 210, the job control module 120 processes the request, and transfers the process to the image input/output control module 140. That is, the job control module 120 functions as a request obtaining unit which obtains a function request from the image processing apparatus 210. The image input/output control module 140 transmits the file storage request to the cloud-service providing apparatus 250 (step S308). That is, the image input/output control module 140 functions as a request transmitting unit which transmits a request to the cloud-service providing apparatus 250 on the basis of the function request from the image processing apparatus 210. The image processing module 130 may perform image processing such as noise removal on the image data when necessary, and the resulting image data may be stored in the cloud-service providing apparatus 250.

Figure 4:
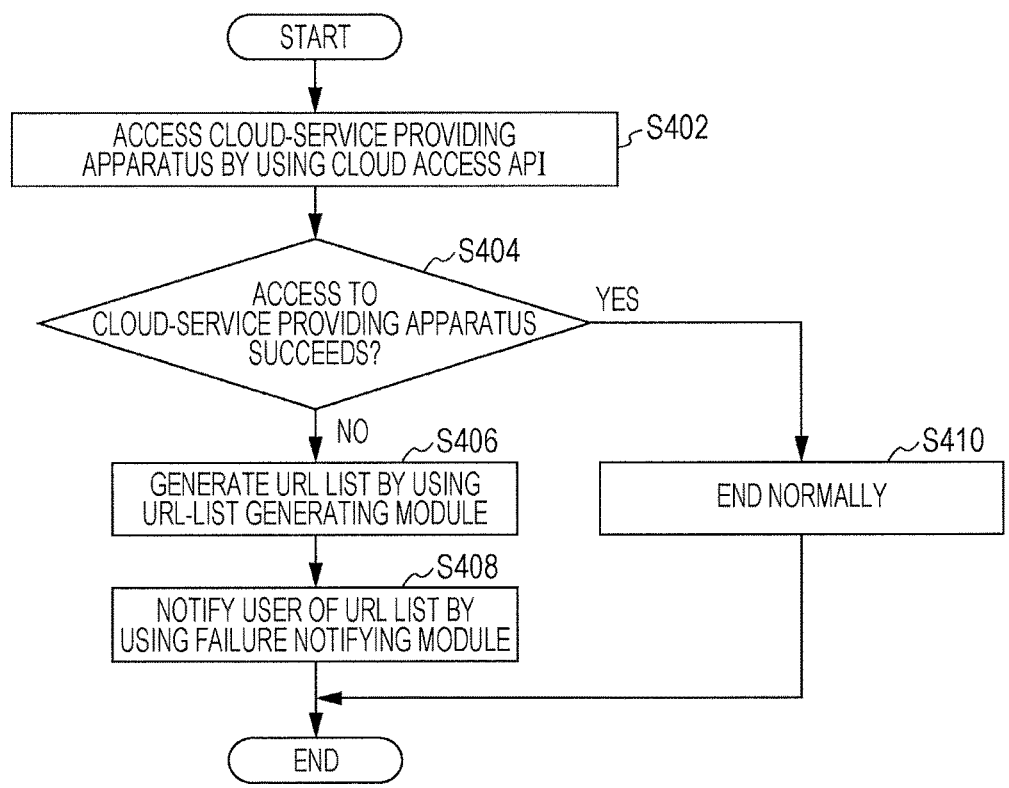
FIG. 4 is a flowchart of an exemplary process according to the present exemplary embodiment.

FIG. 4 is a flowchart of an exemplary process performed in the present exemplary embodiment (by the information processing apparatus 100).

In step S402, the cloud access API 145 accesses the cloud-service providing apparatus 250. Specifically, since the user ID and the specification of a cloud-service providing apparatus 250 are received from the image processing apparatus 210, an access token which is stored in the access information field 530 and which is present in a row in which the received information matches information in the user ID field 510 and the cloud service ID field 520 in the access-token management table 500 is used to access the specified cloud-service providing apparatus 250.

In step S404, it is determined whether or not access to the cloud-service providing apparatus 250 succeeds. If the access succeeds, the process proceeds to step S410. Otherwise, the process proceeds to step S406. Specifically, the image input/output control module 140 recognizes success or failure of storing of the file by using the function of the cloud access API 145. For example, the image input/output control module 140 recognizes failure of storing of the file from a timeout process or the like for the file storage request. When failure of storing of the file is recognized, the image data for the storage request is stored in the temporary storage module 150.

In step S406, the URL-list generating module 170 generates a URL list.

In step S408, the failure notifying module 180 notifies a user of the URL list.

In step S410, the process normally ends.

Exemplary processes (<1> to <3>) in which failure handling methods are generated and which are performed by the URL-list generating module 170 and the failure notifying module 180 will be described.

<1> In the example in FIG. 5, a user 1234 may access "GDdddd", "EvvvNnnn", and "Bbb" which are cloud services.

In contrast, a user 2345 may access "GDdddd" and "Bbb" which are cloud services, but not "EvvvNnnn".

For example, in the case where the user 1234 performs operations to upload image data which has been obtained through reading by using the image processing apparatus 210 to "GDdddd", and where the access to "GDdddd" fails due to some problem, the user is notified of a URL (REST request) for uploading the image data to "EvvvNnnn" or "Bbb" which is another cloud service.

A URL for uploading the image data to "GDdddd" to which access has failed may be included as cloud service information to be transmitted. In this case, "GDdddd" is a service just for retry, and "EvvvNnnn" and "Bbb" are included in an alternative service list.

When the user 2345 does the same operation, only a URL to "Bbb" is returned, and "GDdddd" is not included in the list. That is, when storing of the same image data in a cloud service A continuously fails multiple times, use of a cloud service other than the cloud service A may be recommended as a failure handling method. A threshold may be provided for the number of failures.

<2> The user-information management module 160 maintains and manages the user-setting management table 600 as illustrated in the example in FIG. 6. The user-setting management table 600 may be used to generate failure handling methods. That is, a user who receives these failure handling methods may select one from these choices.

In the case of user-setting management table 600 illustrated in the example in FIG. 6, when storing of image data in a cloud service fails, the following list is transmitted as failure handling methods to the user 1234:
(1) service specification (in which a list generated by using the process <1> described above is used);
(2) cancel (which causes the image data stored in the temporary storage module 150 to be deleted); and (3) download (which causes the image data stored in the temporary storage module 150 to be downloaded to the user terminal 280).

For each of these failure handling methods, the URL-list generating module 170 generates a URL for performing the process. When the URL is accessed, the information processing apparatus 100 detects the access, and performs the process corresponding to the URL.

In the case of the user 2345, URLs for "service specification" and "cancel" are transmitted, and a URL for "download" is not transmitted.

In the case of a user 3456, only a URL for "download" is transmitted.

<3> When a URL for retry is to be added as in the process <1> described above, the URL is added or changed in accordance with the reason of the error.

In the process <1>, in the case where image data is to be uploaded to "GDdddd" which is a cloud service, and where a failure occurs because the amount of the image data exceeds the upper limit of the data amount available for uploading to "GDdddd", the error occurs even when retry is performed multiple times.

Therefore, as described below, the URL is added or changed in accordance with the reason of the error.

3.1) In the case where the error occurs due to the user, and where a procedure performed by the user resolves the error, the URL for a page in which the procedure may be performed or for a help page is added to the URL list. The URL for retry is left in the URL list.

For example, as described above, in the case where an error occurs because the amount of the data exceeds the upper limit of the data amount, and where the upper limit may be increased by making payment, the URL for the payment is added as a failure handling method. In the case where a user operation resolves the error (such as a case in which the error may be resolved by uninstalling an application for the cloud and installing again the application), the URL for a page in which the operation for resolving the error is described is added as a failure handling method.

3.2) In the case where the reason of the error is not due to the user, and where the error is not resolved by retry (such as an error occurring inside the cloud), the URL for retry is removed from the URL list.

3.3) In the case where the error is such that retry may cause the data to be uploaded, for example, the error occurs due to temporary congestion in the communication line 290, the URL for retry is added to the URL list.

The reason of the error may be determined by using an error code returned from the cloud-service providing apparatus 250 or the like when image data is stored in the cloud-service providing apparatus 250.

An exemplary URL list generated by the URL-list generating module 170 will be described. That is, an exemplary method of presenting failure handling methods (choices) received by the user terminal 280 will be described below.

(1) The URL for a choice is directly presented in text in a failure notification. When the URL is clicked, an operation corresponding to the URL is executed.

(2) A failure notification includes a URL for selecting a failure handling method. When the URL is clicked, a page in which choices are listed is displayed on a browser.

(3) A combination of (1) and (2). For example, in the case where the operation described in (1) fails, a transition to a screen according to (2) may be made.

In (1), a user performs operations only in the failure notification (in electronic mail software when electronic mail is used as failure notification). Only the operation result needs to be displayed on a browser.

In (2), after an error occurs, setting of an alternative cloud service is performed, whereby, for example, data may be stored in the alternative cloud service.

Figure 7:
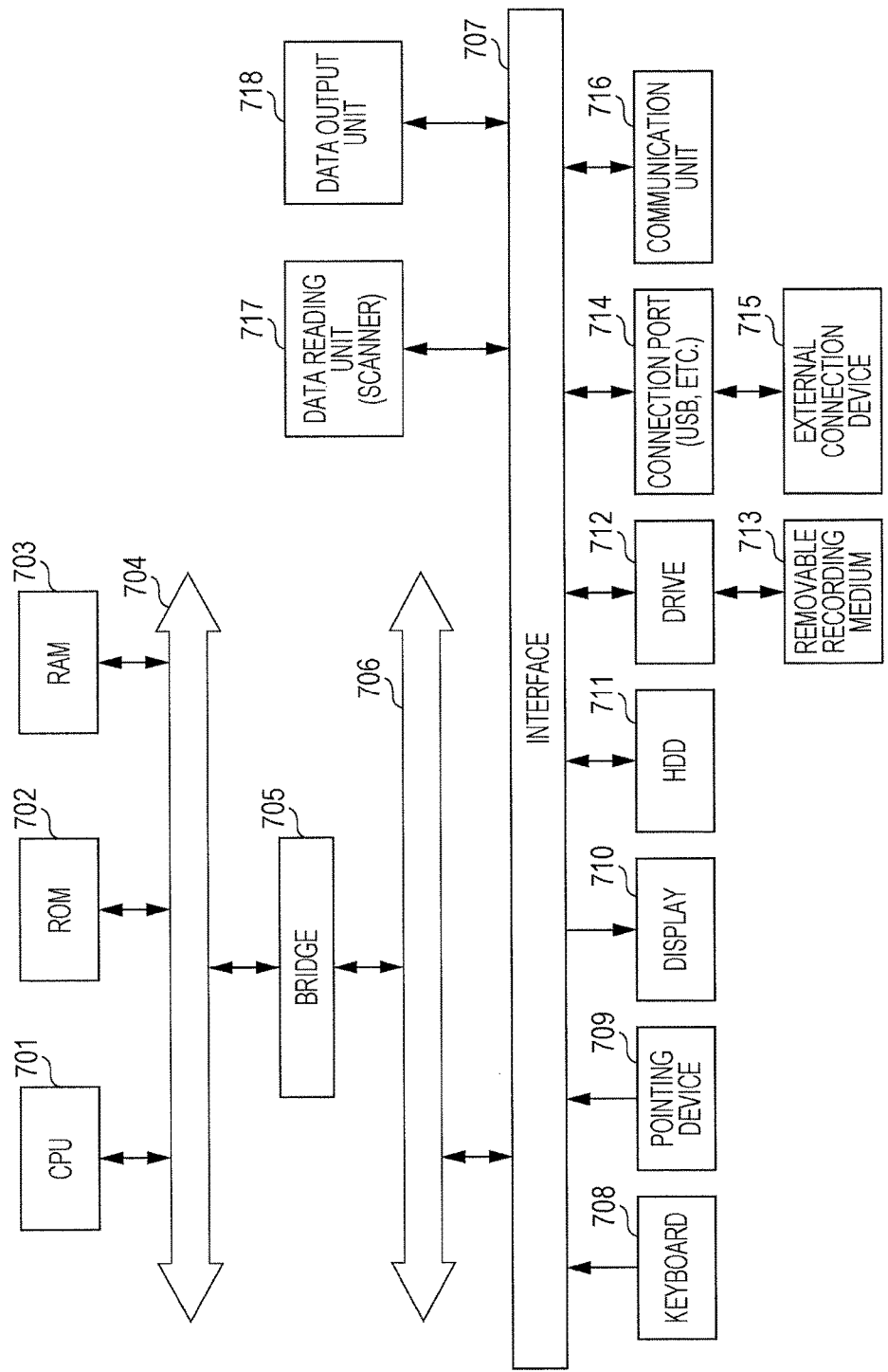
FIG. 7 is a block diagram illustrating an exemplary hardware configuration of a computer achieving the present exemplary embodiment.

Referring to FIG. 7, an exemplary hardware configuration of the information processing apparatus according to the present exemplary embodiment will be described. The configuration illustrated in FIG. 7 is constituted, for example, by a personal computer (PC), and an exemplary hardware configuration including a data reading unit 717 such as a scanner and a data output unit 718 such as a printer is illustrated.

A CPU 701 is a controller performing processes according to computer programs describing execution sequences of the various modules described in the above-described exemplary embodiment, that is, the communication line interface 105, the input/output control module 110, the job control module 120, the image processing module 130, the image input/output control module 140, the cloud access API 145, the user-information management module 160, the URL-list generating module 170, the failure notifying module 180, and the like.

A read only memory (ROM) 702 stores programs used by the CPU 701, operation parameters, and the like. A RAM 703 stores programs used in execution performed by the CPU 701, parameters changed as appropriate in the execution, and the like. These are connected to each other through a host bus 704 constituted, for example, by a CPU bus.

The host bus 704 is connected to an external bus 706 such as a Peripheral Component Interconnect/Interface (PCI) bus via a bridge 705.

A keyboard 708 and a pointing device 709 such as a mouse are input devices operated by an operator. A display 710 which is a liquid-crystal display apparatus, a cathode ray tube (CRT), or the like displays various types of information as text and image information.

A hard disk drive (HDD) 711 includes a hard disk (which may be a flash memory or the like), drives the hard disk, and records or reproduces information and programs executed by the CPU 701. The hard disk achieves the function of the temporary storage module 150 or the like. Further, the HDD 711 stores other various data, various computer programs, and the like.

A drive 712 reads data or programs recorded in a removable recording medium 713, such as a magnetic disk, an optical disk, a magneto-optical disk, or a semiconductor memory, which is mounted, and supplies the data or the programs to the RAM 703 connected via an interface 707, the external bus 706, the bridge 705, and the host bus 704. The removable recording medium 713 is also available as a data recording area similar to the hard disk.

A connection port 714 which is a port for connecting an external connection device 715 has a connection unit of USB, IEEE 1394, or the like. The connection port 714 is connected to the CPU 701 and the like via the interface 707, the external bus 706, the bridge 705, the host bus 704, and the like. A communication unit 716 is connected to a communication line, and performs data communication with the outside. The data reading unit 717 which is, for example, a scanner, reads documents. The data output unit 718 which is, for example, a printer, outputs document data.

The hardware configuration of the information processing apparatus in FIG. 7 is merely one exemplary configuration. The exemplary embodiment is not limited to the configuration in FIG. 7, and may have any configuration as long as the modules described in the exemplary embodiment may be executed. For example, some modules may be constituted by dedicated hardware, such as an application specific integrated circuit (ASIC), and some modules which are installed in an external system may be connected through a communication line. In addition, systems having the configuration illustrated in FIG. 7 may be connected to one another through communication lines and may cooperate with one another. In particular, the hardware configuration may be installed in portable information communication equipment (including a portable phone, a smartphone, a mobile device, a wearable computer), home information equipment, a robot, a copier, a fax, a scanner, a printer, a multi-function device (an image processing device having at least two of the functions of scanning, printing, copying, faxing, and the like), or the like as well as a personal computer.

The programs described above may be provided through a recording medium which stores the programs, or may be provided through a communication unit. In these cases, for example, the programs described above may be interpreted as an invention of "a computer-readable recording medium that stores a program".

The term "a computer-readable recording medium that stores a program" refers to a computer-readable recording medium that stores programs and that is used for, for example, installation and execution of the programs and distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray™ Disk, a magneto-optical disk (MO), a flexible disk (FD), a magnetic tape, a hard disk, a ROM, an electrically erasable programmable ROM (EEPROM™), a flash memory, a RAM, and a secure digital (SD) memory card.

The above-described programs or some of them may be stored and distributed by recording them on the recording medium. In addition, the programs may be transmitted through communication, for example, by using a transmission medium of, for example, a wired network or a wireless communication network which is used for a local area network (LAN), a metropolitan area network (MAN), a wide area network (WAN), the Internet, an intranet, an extranet, and the like, or a combination of these. Instead, the programs may be carried on carrier waves.

The above-described programs may be included in other programs, or may be recorded on a recording medium along with other programs. Instead, the programs may be recorded on multiple recording media by dividing the programs. The programs may be recorded in any format, such as compression or encryption, as long as it is possible to restore the programs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
   a memory configured to store:
     authentication information of a user of a cloud service; and
     failure handling information for the user, the failure handling information being configured to be used if storing of data in the cloud service fails;
   a receiving unit configured to receive, from an image processing apparatus;
     user information of the user;
     data to be stored in the cloud service; and
     a storage request to the cloud service;
   a transmitting unit configured to transmit, to the cloud service, the authentication information of the user and the data to be stored in the cloud service in accordance with the storage request; and
   a second transmitting unit configured to, if storing of the data in the cloud service fails, refer to the failure handling information and transmit information about a failure handling method to the user,
   wherein the second transmitting unit is configured to suggest alternative information about the failure handling method if storing of the data in the cloud service fails multiple times.

2. The relay apparatus according to claim 1, wherein the second transmitting unit is configured to transmit URL information comprising a link to a page for performing a process for the failure handling method.

3. The relay apparatus according to claim 1, wherein the second transmitting unit is configured to change information about the failure handling method in accordance with a reason of the failure, and transmit the changed information to the user.

4. The relay apparatus according to claim 2, wherein the second transmitting unit is configured to change information about the failure handling method in accordance with a reason of the failure, and transmit the changed information to the user.

5. The relay apparatus according to claim 1, wherein the alternative information comprises a recommendation for a second cloud service that is different from the cloud service.

6. The relay apparatus according to claim 1, wherein the second transmitting unit is configured to suggest alternative information about the failure handling method in response to storing of the data in the cloud service failing multiple times.

7. A non-transitory computer readable medium storing a program causing a computer to execute a relay process comprising:
   storing authentication information of a user of a cloud service and failure handling information for the user, the failure handling information being configured to be used if storing of data in the cloud service fails;
   receiving, from an image processing apparatus:
     user information of the user;
     data to be stored in the cloud service; and
     a storage request to the cloud service;
   transmitting, to the cloud service, the authentication information of the user and the data to be stored in the cloud service in accordance with the storage request;
   if storing of the data in the cloud service fails, referring to the failure handling information and transmitting information about a failure handling method to the user; and suggesting alternative information about the failure handling method if the storing of the data in the cloud service fails multiple times.

8. A relay method comprising:

storing authentication information of a user of a cloud service and failure handling information for the user, the failure handling information being configured to be used if storing of data in the cloud service fails;

receiving, from an image processing apparatus:
user information of the user;
data to be stored in the cloud; and
a storage request to the cloud service;

transmitting, to the cloud service, the authentication information of the user and the data to be stored in the cloud service in accordance with the storage request;

if storing of the data in the cloud service fails, referring to the failure handling information and transmitting information about a failure handling method to the user; and suggesting alternative information about the failure handling method if the storing of the data in the cloud service fails multiple times.

* * * * *